United States Patent [19]

Henry, Jr. et al.

[11] 4,379,866

[45] Apr. 12, 1983

[54] PLUGGING REFRACTORY MATERIAL HAVING RESIN BINDER SYSTEM

[75] Inventors: Francis W. Henry, Jr.; Subrata Banerjee, both of Glen Burnie, Md.

[73] Assignee: General Refractories Company, Bala Cynwyd, Pa.

[21] Appl. No.: 301,760

[22] Filed: Sep. 14, 1981

[51] Int. Cl.$^3$ ............................................... C08G 8/28
[52] U.S. Cl. ................................. 523/140; 523/145; 528/156; 528/162
[58] Field of Search ............... 260/38; 528/156, 162; 523/140, 145

[56] References Cited

U.S. PATENT DOCUMENTS

| | | | |
|---|---|---|---|
| 3,007,805 | 11/1961 | Cline | 106/44 |
| 3,917,558 | 11/1975 | Gardikes et al. | 260/38 |
| 4,022,739 | 5/1977 | Bove | 260/28 |
| 4,072,531 | 2/1978 | Funabiki et al. | 106/56 |
| 4,082,718 | 4/1978 | Ando et al. | 260/33 |
| 4,097,443 | 6/1978 | Nakamura | 260/38 |
| 4,290,928 | 9/1981 | Funabiki | 260/38 |

OTHER PUBLICATIONS

IMC Chemical Group, Inc., NP Division Technical Data Sheet ro TRIS NITRO Brand of Tris(hydroxymethyl)nitromethane.

Primary Examiner—Paul R. Michl
Attorney, Agent, or Firm—Finnegan, Henderson, Farabow, Garrett & Dunner

[57] ABSTRACT

Tris (hydroxymethyl) nitromethane is used as the formaldehyde-source, cross-linking agent for a phenol-formaldehyde or resorcinol polymer resin binder system for a plugging refractory to enhance the plugging refractory's ability to withstand residence periods in a mud gun without premature solidification.

28 Claims, No Drawings

PLUGGING REFRACTORY MATERIAL HAVING RESIN BINDER SYSTEM

BACKGROUND OF THE INVENTION

The present invention relates to plugging refractory materials having resin binder systems.

It is known that condensation products of formaldehyde with phenol or resorcinol can be used as binders in refractory materials. (U.S. Pat. No. 3,007,805, Column 3, lines 45–49.) Use of such conventional phenolic resin binders, however, has been characterized by high bonding strength in the low temperature range which may cause the material to solidify prematurely. (U.S. Pat. No. 4,072,531, Column 1, lines 25–30.) In plugging refractories, that is, refractories applied with a mud gun, this is very undesirable because it impairs the ability of the gunned refractory material to withstand residence periods in the mud gun without premature solidification.

Various solutions to this problem have been offered in the past. U.S. Pat. No. 4,022,739 implies that this problem may be overcome by adding to the resin a material which inhibits the speed of polymerization, e.g., hydroquinone or cobalt phthalate. (Column 2, lines 52–58). U.S. Pat. No. 4,072,531 suggests that this problem may be overcome by using a lignin-modified resin. (Column 1, lines 40–49.) U.S. Pat. No. 4,082,718 states that this problem can be overcome by adding to the resin an appropriate amount (0.5 to 10% of the resin) of the formaldehyde-source, cross-linking agent. (Column 5, lines 64–Column 6, line 14). Hexamethylenetetramine, acetal resin, paraformaldehyde, and trioxane are listed as suitable formaldehyde-source, cross-linking agents. (Column 6, lines 27–33.) None of these solutions, however, has been found to be altogether satisfactory.

The inventors have discovered that using tris (hydroxymethyl) nitromethane as the formaldehyde-source, cross-linking agent for a phenol-formaldehyde or resorcinol polymer resin binder system for a plugging refractory instead of a conventional formaldehyde-source, cross-linking agent for a phenol-formaldehyde or resorcinol polymer resin binder system for a plugging refractory, such as hexamethylene tetramine, increases the time it takes for the plugging refractory material to harden. On account of this longer hardening time, the plugging refractory material of the present invention can withstand longer residence periods in a mud gun without premature solidification.

In the past tris (hydroxymethyl) nitromethane has been primarily used as a bactericidal agent. It has also been used as a plasticizer in the preparation of phenol-formaldehyde resins to produce a more flexible, resilient resin. Heretofore, however, it has not been suggested that tris (hydroxymethyl) nitromethane can be used as the formaldehyde-source, cross-linking agent for a phenol-formaldehyde or resorcinol polymer resin binder system for a plugging refractory in order to increase the time it takes for the plugging refractory to harden, and thereby enhance the ability of the plugging refractory to withstand residence periods in a mud gun without premature solidification.

SUMMARY OF THE INVENTION

It is, therefore, a main object of the present invention to overcome the above-mentioned problem.

It is a more specific object of the present invention to provide a plugging refractory which has a resin binder system and can withstand residence periods in a mud gun without premature solidification.

A further object of the present invention is to provide a method of making a plugging refractory which has a resin binder system and can withstand residence periods in a mud gun without premature solidification.

A further object of the present invention is to provide a formaldehyde-source, cross-linking agent for a phenol-formaldehyde or resorcinol polymer resin binder system for a plugging refractory which will cause the plugging refractory to harden at a slower rate than a plugging refractory made with a conventional formaldehyde-source, cross-linking agent for a phenol-formaldehyde or resorcinol polymer resin binder system for a plugging refractory, and thereby enhance the gunned refractory's ability to withstand residence periods in a mud gun without premature solidification.

Additional objects and advantages of the invention will be set forth in part in the description which follows, and in part will be obvious from the description, or may be learned by practice of the invention. The objects and advantages of the invention may be realized and attained by means of instrumentalities and combinations particularly pointed out in the appended claims.

To achieve the objects and in accordance with the purpose of the invention, as embodied and broadly described herein, the invention comprises a plugging refractory comprising a refractory material, and a resin binder system, the resin binder system comprising a phenol-formaldehyde or resorcinol polymer resin and a formaldehyde-source, cross-linking agent, the formaldehyde-source, cross-linking agent being tris (hydroxymethyl) nitromethane.

To further achieve the objects and in accordance with the purpose of the invention, as embodied and broadly described herein, the invention comprises a method of making a plugging refractory which comprises adding to a refractory material a resin binder system, the resin binder system comprising a phenol-formaldehyde or resorcinol polymer resin and a formaldehyde-source, cross-linking agent, the formaldehyde-source, cross-linking agent being tris (hydroxymethyl) nitromethane.

To further achieve the objects and in accordance with the purpose of the invention, as embodied and broadly described herein, the invention comprises a method of using tris (hydroxymethyl) nitromethane as a formaldehyde-source, cross-linking agent for a phenol-formaldehyde or resorcinol polymer resin binder system for a plugging refractory in order to enhance the plugging refractory's ability to withstand residence periods in a mud gun without premature solidification.

The foregoing and other objects, features, and advantages of the present invention will be made more apparent from the following description of the preferred embodiments.

DESCRIPTION OF THE PREFERRED EMBODIMENTS

Reference will now be made in detail to the present preferred embodiments of the invention.

A plugging refractory in accordance with the present invention comprises a refractory material, and a resin binder system, the resin binder system comprising a phenol-formaldehyde or resorcinol polymer resin, and a formaldehyde-source, cross-linking agent, the formaldehyde-source, cross-linking agent being tris (hydroxymethyl) nitromethane.

A wide variety of conventional refractory materials can be used in accordance with the present invention. Suitable refractory materials include: carbon, calcined fireclay, raw ball clay, silicon carbide, sand and coke breeze. Essentially any refractory composition suitable for use with conventional coal tar binders can be used with the binder system of the present invention.

A wide variety of conventional phenol-formaldehyde or resorcinol polymer resins can be used in accordance with the present invention. Preferably, however, novolac-type phenol-formaldehyde resins are used. The novolac-type phenol-formaldehyde resins can be supplied in either liquid or powder form. Thus far, however, better results have been achieved with solid novolac-type phenol-formaldehyde resin powder. In the preferred embodiment of the present invention, the amount of phenol-formaldehyde or resorcinol polymer resin is between 3 and 20% by weight of the refractory material.

The formaldehyde-source cross-linking agent in accordance with the present invention is tris (hydroxymethyl) nitromethane. Tris (hydroxymethyl) nitromethane is a white crystalline solid which is highly soluble in water and alcohols but practically insoluble in hydrocarbons. It is indexed by *Chemical Abstracts* as 2-hydroxymethyl-2-nitro-1,3-propanediol, and manufactured and sold by IMC Chemical Group, Inc. under the trade name, TRIS NITRO. The pure material has the following properties:

TABLE I

| Physical Properties of Tris (Hydroxymethyl) Nitromethane | |
|---|---|
| Molecular Weight (calc.) | 151.124 |
| Melting Point*, approx | 175–176° C. |
| pH of 0.1M Aqueous Solution at 20° C. | 5.0 |
| Critical Humidity Point at 40° C. | 66% R.H. |
| Solubility in water, 20° C. | 220 g/100 ml |
| Very soluble in alcohols; insoluble in hydrocarbons such as heptane, diisobutylene, kerosene, styrene, mineral oil, benzene, toluene. | |

*Melts with decomposition
(This information was obtained from IMC Chemical Group, Inc.'s technical data sheet on TRIS NITRO.)

In the preferred embodiment of the present invention the amount of tris (hydroxymethyl) nitromethane is between 3 and 20% by weight of the phenol-formaldehyde or resorcinol polymer resin.

There is a variety of uses for the plugging refractories of the present invention. Essentially, wherever premature solidification in a mud gun is a problem, the gunned refractories of the present invention provide a solution. In particular, the plugging refractories of the present invention are useful in plugging blast furnace tapholes. They could also be used as specialty mixes for carbon-containing bricks and iron-making cupolas.

A method of making a plugging refractory in accordance with the present invention comprises adding to a refractory material a resin binder system, the resin binder system comprising a phenol-formaldehyde or resorcinol polymer resin and a formaldehyde-source, cross-linking agent, the formaldehyde-source, cross-linking agent being tris (hydroxymethyl) nitromethane.

The binder system can be mixed into the refractory material either hot or cold. Preferably, the mixing temperature is between 100° F. and 220° F.

A solvent may be used to facilitate mixing. A number of solvents can be used for this purpose. In the preferred embodiment the solvent is selected from the group: cellosolve; cellosolve acetate; polyethylene glycol (100–500 molecular weight); ethylene glycol; and combinations thereof. When hot mixing is employed, smaller amounts of solvents are required than for cold mixing. It is within the ordinary skill of one in this art to determine the appropriate amount of solvent to be used in making a plugging refractory in accordance with this invention.

Linseed oil can also be added to enhance the plasticity of the plugging refractory mix. Its slow-boiling quality contributes a plasticizing effect.

As embodied herein, Examples I and II illustrate conceptions of two preferred embodiments of the present invention:

EXAMPLE I

To a refractory material containing carbon, fireclay, ball clay, and silicon carbide, the following are added:

| | | |
|---|---|---|
| resorcinol polymer resin | 3–20% | by wt. of refractory material |
| tris (hydroxymethyl) nitromethane | 0.25–1.6% | by wt. of refractory material |
| polyethylene glycol 400 | 1–5% | by wt. of refractory material |
| cellosolve acetate | 1–10% | by wt. of refractory material |
| linseed oil | 0–5% | by wt. of refractory material |

EXAMPLE II

To a refractory material containing carbon, fireclay, ball clay, and silicon carbide, the following are added:

| | | |
|---|---|---|
| novolac resin | 3–20% | by wt. of refractory material |
| tris (hydroxymethyl) nitromethane | 1.0–1.5% | by wt. of refractory material |
| cellosolve | 0–5% | by wt. of refractory material |
| polyethylene glycol 400 | 0–3% | by wt. of refractory material |
| linseed oil | 0–3% | by wt. of refractory material |

In accordance with the present invention, tris (hydroxymethyl) nitromethane is used as a formaldehyde-source, cross-linking agent for a phenol-formaldehyde or resorcinol polymer resin binder system for a plugging refractory in order to enhance the plugging refractory's ability to withstand residence periods in a mud gun without premature solidification.

It has been discovered that using tris (hydroxymethyl) nitromethane as the formaldehyde-source, cross-linking agent for a phenol-formaldehyde or resorcinol polymer resin binder system for a plugging refractory instead of a conventional formaldehyde-source, cross-linking agent, for a phenol-formaldehyde or resorcinol polymer resin binder system for a plugging refractory, such as hexamethylene tetramine, increases the time it takes for the gunned refractory material to harden. This is shown by the comparative test data compiled in Table II.

TABLE II

| Properties of Phenolic Resin Bonded Taphole Mixes | | | | |
|---|---|---|---|---|
| Composition, Weight Percent | I | II | III | IV |
| Coke Breeze | 25.0 | 25.0 | 25.0 | 25.0 |
| Raw Ball Clay | 27.0 | 27.0 | 27.0 | 27.0 |
| Calcined Fireclay | 15.0 | 15.0 | 15.0 | 15.0 |
| Sand | 13.0 | 13.0 | 13.0 | 13.0 |
| Others | 20.0 | 20.0 | 20.0 | 20.0 |
| ADDED: | | | | |
| Liquid Novolac Resin | 19.2 | 19.2 | — | — |
| Solid Novolac Powder | — | — | 13.0 | 13.0 |
| Ethylene Glycol | 3.0 | 3.0 | 10.0 | 11.0 |
| Polyethylene Glycol | 1.0 | 1.0 | 1.0 | 1.0 |
| Hexamethylene Tetramine | 0.45 | — | 0.4 | — |
| Tris (Hydroxymethyl) Nitromethane | — | 0.45 | — | 0.4 |
| Cold Crushing Strength, psi after 5 minutes at 600° C. | Sample Unhardened | Sample Unhardened | Sample Unhardened | Sample Unhardened |
| Cold Crushing Strength, psi after 10 minutes at 600° C. | 705 | 270 | 545 | Sample Unhardened |
| Cold Crushing Strength, psi after 20 minutes at 600° C. | 745 | 370 | 295 | 345 |
| Cold Crushing Strength, psi after 30 minutes at 600° C. | 580 | 365 | 290 | 365 |

This data was obtained from tests in which four phenolic resin bonded taphole mixes were compared. Each mix had identical refractory components. In Mixes I and II, a liquid novolac-type phenolic resin was used. Mixes III and IV used a solid novolac-type phenolic resin powder. In Mixes I and III conventional hexamethylene tetramine was used as the formaldehyde-source, cross-linking agent. Mixes II and IV used tris (hydroxymethyl) nitromethane as the formaldehyde-source, cross-linking agent.

These test show that hardening was much slower in Mixes II and IV, wherein tris (hydroxymethyl) nitromethane was used, than in Mixes I and III wherein the conventional formaldehyde-source cross-linking agent, hexamethylene tetramine, was used. Particularly dramatic is the difference between Mixes III and IV (resin supplied in solid power form). After 10 minutes at 600° C., Mix III with hexamethylene tetramine had a cold brushing strength of 545 psi whereas Mix IV with tris (hydroxymethyl) nitromethane was still unhardened. Moreover, it should be noted that this slower hardening was not accompanied by less hardening. After 30 minutes at 600° C., Mix IV was actually harder than mix III.

Accordingly, it appears from this data that the plugging refractory materials of the present invention will be able to withstand longer residence periods in a mud gun without premature solidification than could prior art plugging refractory materials made with conventional formaldehyde-source, cross-linking agents in view of the fact that it takes the plugging refractories of the present invention longer to harden.

It will be apparent to those skilled in the art that various modifications and variations can be made in the present invention without departing from the scope or spirit of the invention. Thus, it is intended that the present invention cover the modifications and variations of this invention provided that they come within the scope of the appended claims and their equivalents.

What is claimed is:

1. A plugging refractory comprising a refractory material and a resin binder system, said resin binder system comprising a phenol-formaldehyde or resorcinol polymer resin and a formaldehyde-source, cross-linking agent, the formaldehyde-source, cross-linking agent being tris (hydroxymethyl) nitromethane.

2. Plugging refractory of claim 1 wherein said phenol-formaldehyde or resorcinol polymer resin is 3 to 20% by weight of said refractory material.

3. Plugging refractory of claim 1 wherein said tris (hydroxymethyl) nitromethane is 3 to 20% by weight of said phenol-formaldehyde or resorcinol polymer resin.

4. Plugging refractory of claim 1 wherein said phenol-formaldehyde or resorcinol resin is a novolac-type phenolic resin.

5. Plugging refractory of claim 4 wherein said novolac-type phenolic resin is supplied in solid form.

6. Plugging refractory of claim 1 wherein said refractory material is a composition containing carbon, calcined fireclay, raw ball clay, silicon carbide, sand, or coke breeze, or combinations thereof.

7. Plugging refractory mix comprising the plugging refractory of claim 1 and a solvent or combination of solvents selected from the group: cellosolve, cellosolve acetate, polyethylene glycol (100–500 molecular weight) and ethylene glycol.

8. Plugging refractory mix comprising the plugging refractory of claim 1 and linseed oil.

9. A blast furnace taphole mix comprising said plugging refractory of claim 1.

10. Blast furnace taphole mix comprising: refractory material; liquid novolac-type phenolic resin in an amount equal to approximately 19.2% by weight of said refractory material; solvent; and tris (hydroxymethyl) nitromethane in an amount equal to approximately 0.45% by weight of said refractory material.

11. Blast furnace taphole mix comprising: refractory material; solid novolac-type phenolic resin powder in an amount equal to approximately 13% by weight of said refractory material; solvent; and tris (hydroxymethyl) nitromethane in an amount equal to approximately 0.4% by weight of said refractory material.

12. A method of making a plugging refractory which comprises adding to a refractory material, a resin binder system, the resin binder system comprising a phenol-formaldehyde or resorcinol polymer resin and a formaldehyde-source, cross-linking agent, said formaldehyde-source, cross-linking agent being tris (hydroxymethyl) nitromethane.

13. Method of claim 12 wherein the amount of phenol-formaldehyde or resorcinol polymer resin added is 3 to 20% by weight of said refractory material.

14. Method of claim 12 wherein the amount of tris (hydroxymethyl) nitromethane added is 3 to 20% by weight of said phenol-formaldehyde or resorcinol polymer resin.

15. Method of claim 12 which also includes the step of adding a solvent from the group of cellosolve, cellosolve acetate, polyethylene glycol liquid (100 to 500 molecular weight), ethylene glycol, and mixtures thereof to the refractory material.

16. Method of claim 12 which also includes the step of adding linseed oil to the refractory material.

17. Method of claim 12 wherein the added materials are mixed with the refractory material cold.

18. Method of claim 12 wherein the added materials are mixed with the refractory material hot.

19. Method of claim 12 wherein the added materials are mixed with the refractory material at a temperature of from 100° F. to 220° F.

20. Method of claim 12 wherein said phenol-formaldehyde or resorcinol-formaldehyde resin is a novolac-type phenol resin.

21. Method of claim 20 wherein said novolac-type phenolic resin is supplied in solid form.

22. Method of claim 12 which includes the steps of:
forming a refractory material out of carbon, fireclay, ball clay, and/or silicon carbide;
adding a resorcinol polymer resin in an amount equal to 3 to 20% by weight of said refractory material;
adding tris (hydroxymethyl) nitromethane in an amount equal to 0.25 to 1.6% by weight of said refractory material;
adding polyethylene glycol of 400 molecular weight in an amount equal to 1 to 5% by weight of said refractory material; and
adding cellosolve acetate in an amount equal to 1 to 10% by weight of said refractory material.

23. Method of claim 22 which also includes the step of adding linseed oil in an amount equal to up to 5% by weight of said refractory material.

24. Method of claim 12 which includes the steps of:
forming a refractory material out of carbon, fireclay, ball clay, and/or silicon carbide;
adding a novolac-type phenolic resin in an amount equal to 3 to 20% by weight of said refractory material; and
adding tris (hydroxymethyl) nitromethane in an amount equal to 1.0 to 1.5% by weight of said refractory material.

25. Method of claim 24 which also includes the step of adding cellosolve in an amount up to 5% by weight of said refractory material.

26. Method of claim 24 which also includes the step of adding polyethylene glycol of 400 molecular weight in an amount up to 3% by weight of said refractory material.

27. Method of claim 24 which also includes the step of adding linseed oil in an amount up to 3% by weight of said refractory material.

28. A method of using tris (hydroxymethyl) nitromethane as a formaldehyde-source, cross-linking agent for a phenol-formaldehyde or resorcinol polymer resin binder system for a plugging refractory in order to enhance said plugging refractory's ability to withstand residence periods in a mud gun without premature solidification.

* * * * *